United States Patent [19]

Vandale et al.

[11] 4,219,375
[45] Aug. 26, 1980

[54] MAKING BEAD RINGS FOR VEHICLE TIRES

[75] Inventors: Leonard A. Vandale; Douglas L. Winslow, both of Akron, Ohio

[73] Assignee: The Goodyear Tire & Rubber Company, Akron, Ohio

[21] Appl. No.: 955,063

[22] Filed: Oct. 26, 1978

[51] Int. Cl.² ............................................. B29H 17/32
[52] U.S. Cl. ..................................... 156/136; 140/88; 156/422; 242/157 R; 245/1.5
[58] Field of Search ................... 156/136, 405 R, 422, 156/460, 421; 242/34, 147 R, 152, 153, 157 R, 157.1; 245/1.5; 140/88

[56] References Cited

U.S. PATENT DOCUMENTS

| Re. 27,547 | 1/1973 | Lang | 156/136 |
|---|---|---|---|
| 1,964,445 | 6/1934 | Wikle | 140/92.2 |
| 1,986,094 | 1/1935 | Allan | 156/422 |
| 2,014,359 | 9/1935 | Morrison | 245/1.5 |
| 2,151,306 | 3/1939 | Shook | 156/422 |
| 2,190,805 | 2/1940 | Shook | 156/422 |
| 2,979,109 | 4/1961 | Dieckmalin | 245/1.5 |
| 3,016,322 | 1/1962 | White | 156/422 |
| 3,057,566 | 10/1962 | Braden | 156/422 |
| 3,080,127 | 3/1963 | Porter | 156/422 |
| 3,475,255 | 10/1969 | Lang | 156/422 |

FOREIGN PATENT DOCUMENTS 2133673 1/1973 Fed. Rep. of Germany ........... 156/136

Primary Examiner—John E. Kittle
Attorney, Agent, or Firm—R. S. Washburn

[57] ABSTRACT

A method and an apparatus employing a formed guide shoe assembly controls the placement of successive convolutions of elastomer-coated wire on a bead-winding drum. The guide shoe assembly is not rotatable but accommodates the softly coated wire slidably along an extended curvilinear groove to initial contact with the winding drum or with preceding convolutions of coated wire thereon. A convergent channel in the assembly ensures safe smooth approach to the curvilinear groove. The foregoing abstract is not to be taken as limiting the invention of this application, and in order to understand the full nature and extent of the technical disclosure of this application, reference must be made to the accompanying drawing and the following detailed description.

9 Claims, 3 Drawing Figures

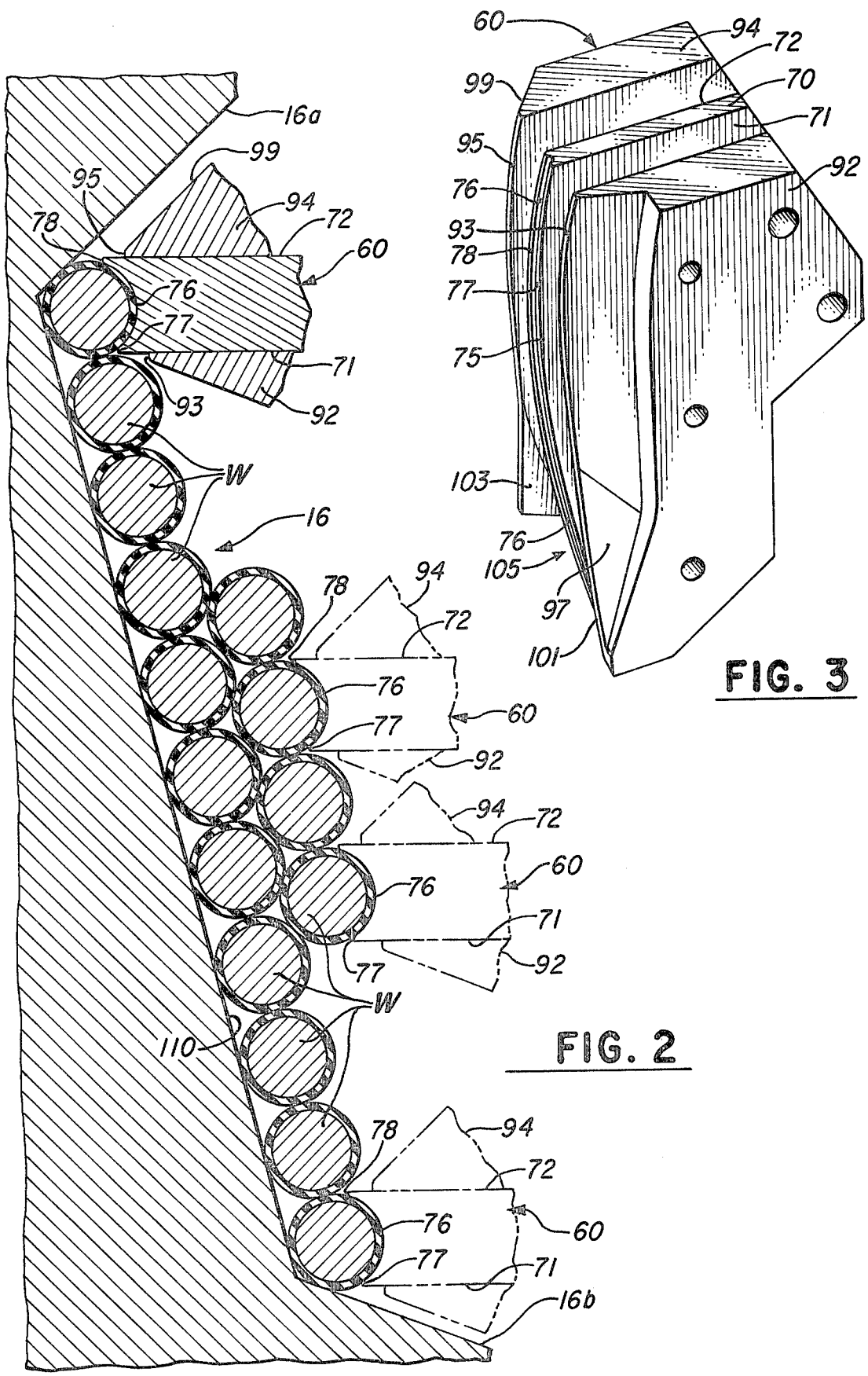

MAKING BEAD RINGS FOR VEHICLE TIRES

The present invention relates to methods and apparatus for making tire beads and particularly to means for and steps of placing successive convolutions of elastomer-coated wire precisely with respect to the winding drum on which a tire bead is formed.

Conventionally, the beads for tires are formed by winding one or more wires about a winding drum rotatable about an axis in which a peripheral groove in the rim of the winding drum receives successive convolutions of the wire to form the bead. The axial cross-section of the groove is formed to suit the cross-section of the desired bead. For example, the cross-section of the groove may be rectangular for a bead having a square or rectangular cross-section. The groove may be of trapezoidal axial cross-section to form a cross-section in the bead which is generally hexagonal, the trapezoid being the radially inner part of the hexagon. The groove in the winding drum may also be formed as a trapezoid in which the radially inward base is inclined relative to the axis of the winding drum so as to provide a hexagonal bead cross-section in which at least the radially inner surface is tapered with respect to its own rotation axis. In certain cases bead cross-sections are desired which are oval or circular in which cases the rim groove of the winding drum can be formed as a semi-elipse or a semi-circular cross-section.

Commonly, the winding drum means is provided with at least one and usually a plurality of segments which can be displaced radially inwardly or otherwise to enable the expeditious removal of a completed bead from the groove.

The wire or wires, before being wound about the winding drum means are customarily covered or insulated with uncured gum of a rubbery compound or an equivalent elastomer. The coating or covering on the wire is preferably thin, for example, being about 0.005 inch (about 0.12 to 0.13 mm) in radial thickness. The gum coating applied to the wire is usually soft, deformable, and may be readily peeled from the underlying wire if it is not carefully handled. To supply wire to be coated and wound about the winding drum means, supply means, including essentially a spool, reel, or like package of wire, is arranged to rotate as the wire is taken off, the arrangement commonly being referred to as a let-off. One or more rolls or sheaves around which the wire travels in its path from the spool to the winding drum means is or are included in the system for supplying the wire to the winding drum. There are also included devices to tension the or each individual wire in its travel between the supply spool or let-off and the winding drum.

To apply the coating, each wire travels through a coating, encapsulating, insulating means which is commonly an extruder die arrangement which feeds the desired coating to the wire as it travels through the die head and controls the radial thickness and uniformity of the elastomer applied to the wire. The coating means is disposed at a suitable location along the path of the wire from the supply spools to the winding drum. The system usually incorporates also an accumulator, which is a variable inventory device for taking up or paying out wire at a variable rate so as to compensate for variations in the actual rate of the coated wire as it is applied to the winding drum.

To place each succeeding convolution of the coated wire in its proper location in the groove of the winding drum and in close juxtaposition to the next preceding convolution after the first, traversing means are provided to move the wire in a direction generally parallel to the axis of the winding drum, that is, generally normal to the length of the wire in the vicinity of the winding drum. The path of the wire thus, at least close to the drum, is not fixed but shifts laterally according to the axial widths occupied by succeeding convolutions of coated wire on the drum.

The lateral shifts of the wire relative to the groove in which the wire is wound are made preferably intermittently, in timed relation to the rotation of the drum so that over a predetermined angle of drum rotation, less than one revolution, the coated wire lies in a plane perpendicular to the drum axis and is then shifted axially during a succeeding angle of rotation, less than the first angle, from the plane of the first convolution to the plane of the next succeeding convolution.

To place each convolution of the coated wire properly in the groove of the winding drum heretofore, it has been the practice to employ for each wire a rotatably mounted wheel or disc having a groove in its outer circumference formed to suit the wire diameter closely, to guide the wire during the mentioned lateral shifting and to press the wire sufficiently to adhere the coated wire to the adjacent convolutions and to exclude air from between the convolutions. The groove in the guide wheel or disc needs to be deep enough to retain the wire while lateral shifts occur to position successive convolutions and, to avoid interference with convolutions already placed, the outer edges of the discs are required to be narrow. Hence, the sidewalls of the guide grooves of the disc are thin. Such guide wheels are caused to rotate only by the coated wire. The guide wheels as a result are not only fragile but are subject to rapid wear, frequent damage, and must be replaced frequently.

Since the coating on the wire can easily be distorted or peeled from the wire, it has been believed that only a freely rotating guide wheel of the character described could be used. Any rubbing or sliding contact with the coated wire has been carefully avoided.

We have discovered that, contrary to the prior practice and belief, the apparatus and the method of making tire beads are significantly improved by providing placement means which includes shoe means for slidably engaging the wire, this shoe means having a groove extending along a path to accommodate the wire for guided relative sliding movement therein without rolling contact as in the conventional guide wheel. We have found not only that the relative sliding of the coated wire along the groove of the shoe means does not harmfully affect the wire or the coating thereon but is productive of additional advantages. One important advantage is the greatly extended life of the shoe means as contrasted with the guide wheel or disc heretofore employed.

We have found, as well, that by feeding the coated wire along a path and engaging the wire for sliding contact with the mentioned shoe means while urging the moving wire into contact with the winding drum means by the shoe means, the mentioned disadvantages of rotatable guide wheels are overcome or eliminated.

To acquaint persons skilled in the arts most closely related to the present invention, certain preferred embodiments thereof illustrating a best mode now contemplated for putting the invention into practice are described herein by and with reference to the annexed drawings forming a part of the specification. The embodiments shown and described herein are illustrative and as will become apparent to those skilled in these arts can be modified in numerous ways within the spirit and scope of the invention defined in the claims hereof.

In the drawings:

FIG. 2 is a much enlarged sectional view of the tire bead-making apparatus of FIG. 1 taken on the line 2—2 of FIG. 1;

FIG. 3 is a perspective view enlarged of the placement means of FIG. 1.

Figure 1:
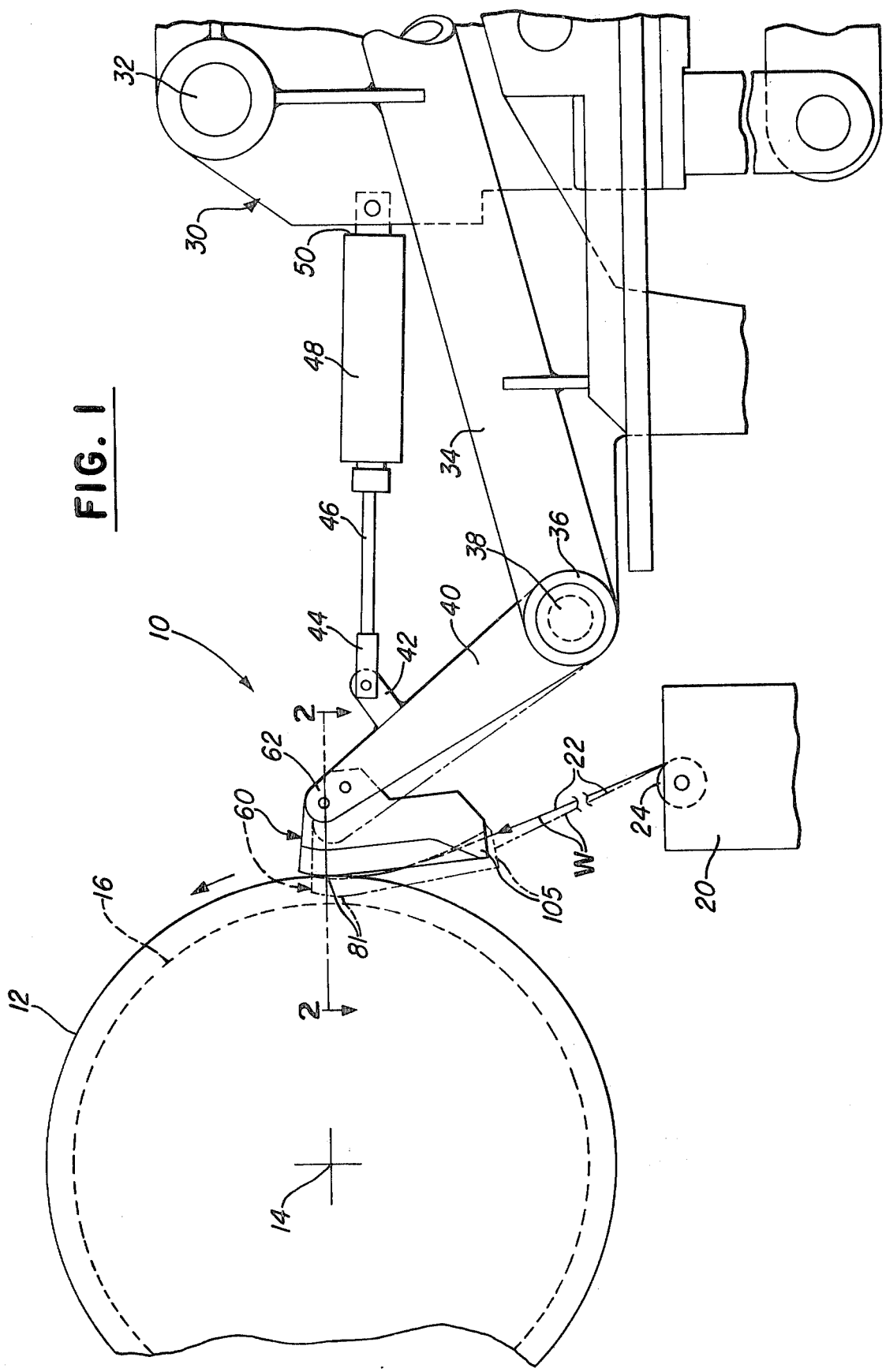
FIG. 1 is a schematic elevation view of a portion of a tire bead-making apparatus embodying the invention.

With reference to FIG. 1, the preferred apparatus 10 includes a bead winding drum 12, mounted for rotation about an axis 14 for winding elastomer coated wire to form a tire bead. The periphery of the drum is provided with a groove 16 the cross-sectional shape of which conforms to the cross-sectional shape at least of the radially inner part of the bead to be formed.

Supply means including let-off and tensioning means are indicated at 20 and can be of any suitable known arrangement and construction capable of delivering wire to be wound about the drum along the final approach path, and a suitably regulated tension. In the present example the tension of the wire is preferably controlled within the limits of 20 to 40 pounds. The final approach path 22 is that span or reach of wire extending from the last sheave 24 of the supply means to the winding drum.

The cross-sectional shape of the groove 16 in which the wire bead is built is shown in greatly enlarged scale in FIG. 2. While the shape of the groove can be varied to suit the form of the desired tire bead, FIG. 2 illustrates a groove adapted to the formation of tire beads having an inclined radially inner surface and a hexagonal cross-section adapted particularly to the building of tire beads for heavy truck tires.

To position successive convolutions of the elastomer coated wire W across the width of the groove, the apparatus 10 includes wire placement means comprising a traverse frame 30 of any suitable construction which can travel reciprocably perpendicular to the plane of FIG. 1 on the slide bar 32 which is fixed relative to the axis 14 on structural parts of the apparatus (not shown). An extension 34 on the frame has an enlarged end or boss 36 which accommodates a pivot shaft 38 located in such a way as to position the swing arm 40 appropriately with respect to the groove 16. A lug 42 on the swing arm is connected by the clevis 44 to the piston rod 46 of a conventional air cylinder 48 the head end 50 of which is pivotally mounted on the frame 30. Controlled air pressure is supplied to the head end of the cylinder and regulates the force applied to the coated wire as it is wound on the drum.

Referring also to FIGS. 2 and 3, the placement means in the presently preferred apparatus incorporates a shoe assembly 60 which slidably and non-rotatably engages the coated wire along the approach path 22 to control precisely the location of the convolutions of coated wire W in the groove 16 relative to preceding convolutions. The shoe assembly 60 is fixed rigidly and non-rotatably on the swing arm 40 near its outer end 62 remote from the pivot shaft 38 so as to follow the changing radius from the axis 14 of the wire being wound in the groove 16 both as the successive convolutions build up in the groove and as the traversing frame 30 moves reciprocally across the width of the groove. It will be apparent that other mechanisms for maintaining the shoe assembly 60 in its desired relation to the drum 12 can be provided. For example, the shoe assembly could be mounted readily on a linear slide for accommodating the variations in radial distance between the guide shoe and the drum axis.

The shoe assembly comprises a center guide plate 70 having parallel plane sides 71,72 and a thickness only slightly greater than the diameter of the coated wire W. In the present embodiment this thickness is greater than the diameter of the coated wire by approximately 0.010 inch (about 0.25 mm). The edge 75 of the center guide plate which extends in a plane normal to the axis 14 of the drum and longitudinally of the approach path 22 of the wire W is formed with a guiding groove 76 which closely conforms to the cross-section radius of the wire W. The edge 75 is formed to extend arcuately, for example, at a radius of 6.5 inches (about 164 mm) coplanar with the sides 71,72, which radius is materially greater than that of the guide wheel heretofore used. The guide groove 76 in the plate is of a constant depth along the guiding edge 75 of the plate and is from 0.005 to 0.008 (about 0.12 to 0.20 mm) less in depth than the wire radius. When, as here, FIG. 2, the guide plate 70 is employed to build a bead having sloped or tapered inner surface, the guiding edges 77,78 of the groove are unequal in their extension, as indicated in FIG. 2, to minimize or avoid contact with the coating of adjacent convolutions of the wire. In cross-section, the arc of the guide groove subtends an angle of approximately 130°–135°. The grooved edge 75 of the guide plate 70 extends along the approach path 22 of the coated wire, from its initial contact at 81 with the drum as it is placed in the groove 16, a significant distance toward the last sheave 24. In the present apparatus the distance has been determined to be at least 1 to 1¼ inches (about 25 to 35 mm) or at least about 16 wire diameters from the axial plane where the wire first contacts the drum. The guiding groove 76 is extended beyond this plane of contact by any suitable distance. It may be noted that the distance beyond the point of contact 81 can be symmetrical with respect to the length of the guide plate edge toward the first sheave and thus provide the advantage of reversibility to increase the useful wear life of the center guide plate.

It has also been found that the center guide plate 70 can be made satisfactorily of a tool steel in AISI grade H-11 which is suitably heat-treated to provide a Rockwell-C hardness of from 53 to 55. The center guide plate having the guide groove described particularly with the length of contact as shown here has the particular advantage of stabilizing wire in its approach path against possible vibration in the coated wire under tension which vibration heretofore has tended to dislodge such wire from the guide wheel.

The guide shoe assembly includes also a pair of support plates 92,94 of materially greater thickness in directions parallel to the drum axis than the center guide plate 70. While the guide shoe 60 can be made as one piece it is found more convenient to construct the assembly of the center plate 70 as described and by clamping the center plate between the support plates 92 and 94 by bolts or the like.

Each of the support plates has an edge 93,95 respectively extending longitudinally alongside the center guide plate edge 75. The edges of the support plates corresponding to the guiding edge of the center plate in the portions of the respective edges seen above the line 2—2 in FIG. 1 are formed to a radius of 6.46 inches (about 163 mm), that is, of 0.040 (about 1 mm) inches less radius than the center plate. The edges 93,95 downward from the line 2—2 are straight and tangent to the 6.46 radius. The arrangement permits the center guide plate edge 75 to protrude relative to the edges 93,95 of the support plates so as to guide the placement of the coated wire without interference with adjacent wire convolutions. In width, the edges 93,95 of the support plates are approximately 0.010 inches (about 0.25 mm). The flanks 97,99 slope therefrom outwardly and away from the center plate at clearance slopes which are at least approximately equal respectively to the slopes of the groove sides 16a, 16b as seen in FIG. 2. In FIG. 2 successive positions of the guide shoe assembly 60 are shown demonstrating the relations of the respective support plates to the groove sides.

In addition, from a location a small distance along the approach path of the oncoming coated wire, the inner surfaces 101,103 of the support plates are flared smoothly outward from the respective plane faces juxtaposed to the center plate so as to form a convergent channel 105 providing a wire approach preguide in which the coated wire is smoothly led into guiding contact with the guide groove 76 of the center plate. The preguiding provided by the approach channel 105 further steadies and stabilizes the oncoming coated wire to insure against its displacement from the groove 76 during winding of the tire bead.

The remaining surfaces of the center guide plate and of the support plates can have any convenient form. In the present embodiment FIGS. 1 and 3 illustrate the general shape of the guide shoe assembly 60.

As has been mentioned, the guide shoe assembly is fixed to the swing arm by a pair of bolts or equivalent which prevent rotation of the assembly relative to the swing arm.

The air cylinder 48 operates to urge the guide shoe assembly toward the base 110 of the groove so as to stitch the oncoming coated wire W in a desired relation with preceding convolutions of the wire. The stitching also assists in eliminating voids between the convolutions.

The traversing frame 30 moves generally parallel to the axis 14 of the winding drum to place the wire convolutions side by side as illustrated in FIG. 2.

The apparatus described has a number of advantages with respect to the prior art. In particular, the guide shoe assembly is capable of placing bead wires which have residual twist which in prior art practice is often sufficient to dislodge the oncoming wire from a rotatable guide wheel. Despite vibrations occurring in wire under tension, wire can be securely and precisely placed on the winding drum smoothly and effectively by the guide shoe assembly since the vibrating wire cannot readily be dislodged from the guiding groove of the center plate, whereas in the prior art practice with the rotating placement wheel preguiding was difficult and excluded by the accepted necessity for permitting the wheel and other wire contacting surfaces to rotate. The smooth and dependable transition from the preguiding provided by the flared surfaces of the support plates and a smooth transition without interruption to the guide groove of the center plate was in no way available in the prior art practices.

The guide shoe assembly as in the apparatus 10 disclosed has demonstrated a service wear life at least five times as great and as much as fifteen times as great in terms of the number of beads produced by the prior art apparatus. In addition, the coated wire can be placed by the guide shoe assembly hereof at significantly greater production rates, for example, coated wire speeds in sliding relation to the shoe means have attained 850 ft. per minute (about 260 m/min) in winding operation.

A particular advantage of the guide shoe assembly lies in the building of tapered base beads.

In the presently described apparatus, the guide shoe assembly is associated with the bead winding drum at a 3 o'clock position as shown. It will be readily apparent to persons skilled in the art that the guide shoe assembly can be positioned at any angular position about the drum axis and, by simple reversal, the shoe means as shown can equally well accommodate an opposite rotation of the winding drum means. The guide shoe means of the present disclosure can be associated individually with each drum of plural bead-making apparatus wherein two or more drums are rotatably mounted on the drum axis in parallel spaced relation.

What is claimed is:

1. Method of making a tire bead of elastomer-coated wire;
   moving said coated wire along a path from supply means to bead-winding drum means having a peripheral bead-forming groove;
   rotating said drum means;
   engaging said coated wire for sliding contact with placement means disposed adjacent to and biased toward said drum means to urge said coated wire into contact with the drum means and respectively with a preceding turn of said coated wire to build up a predetermined number of turns of said coated wire to form said bead.

2. Apparatus for making tire beads including winding drum means, supply means for delivering elastomer-coated wire to said drum means along a predetermined path;
   placement means disposed adjacent to said drum means for continuously guiding said coated wire relatively of said drum means, means for urging said placement means toward said drum means continuously during winding said coated wire on said drum means, said placement means comprising shoe means for slidably engaging said coated wire, said shoe means having a groove extending from adjacent said drum means and along said path to accommodate said wire for guided sliding movement therein.

3. A method as claimed in claim 1, wherein said engaging extends along said path from the axial plane wherein said coated wire first contacts the drum to at least 1 inch (25 millimeters) in a direction opposite the feeding direction of the wire.

4. A method as claimed in claim 1, wherein said sliding contact is in a coated wire accommodating groove extending along said path.

5. A method as claimed in claims 1, 3, or 4, and maintaining said sliding contact by applying tension in said coated wire.

6. A method as claimed in claims 1, 3, or 4, and moving one of said placement means and said drum means relatively of the other transversely of said path to place successive turns of wire along said drum in a predetermined array.

7. Apparatus as claimed in claim 2, said placement means including preguide means for engagement with said coated wire moving relatively thereof laterally of said path and convergent toward said groove in the direction of movement of said coated wire.

8. Apparatus as claimed in claims 2, said groove extending along said path for sliding engagement with said coated wire at least 1 inch from the axial plane whereat said coated wire first contacts the drum means.

9. Apparatus as claimed in claims 2, 7, or 8, wherein the groove of the shoe means and a preguiding convergent channel of the shoe means are in fixed uninterrupted sequential relation along said path.

* * * * *